United States Patent
Carroll et al.

(10) Patent No.: US 9,119,372 B2
(45) Date of Patent: Sep. 1, 2015

(54) SENSOR ARRAY FOR LOCATING AN OBJECT IN SPACE

(75) Inventors: Aaron D. Carroll, Maryville, TN (US); Kristopher C. Hall, Maryville, TN (US); Benjamin D. Nibali, Maryville, TN (US)

(73) Assignee: Dairy Cheq, Inc., Waterloo, Ontario (CA)

( * ) Notice: Subject to any disclaimer, the term of this patent is extended or adjusted under 35 U.S.C. 154(b) by 366 days.

(21) Appl. No.: 13/697,778

(22) PCT Filed: May 13, 2011

(86) PCT No.: PCT/US2011/036524
§ 371 (c)(1),
(2), (4) Date: Nov. 28, 2012

(87) PCT Pub. No.: WO2011/143616
PCT Pub. Date: Nov. 17, 2011

(65) Prior Publication Data
US 2013/0061806 A1     Mar. 14, 2013

Related U.S. Application Data

(60) Provisional application No. 61/345,011, filed on May 14, 2010, provisional application No. 61/351,687, filed on Jun. 4, 2010.

(51) Int. Cl.
*A01J 5/017* (2006.01)
*G01S 17/00* (2006.01)
*G01S 17/06* (2006.01)

(52) U.S. Cl.
CPC ............... *A01J 5/0175* (2013.01); *G01S 17/06* (2013.01)

(58) Field of Classification Search
CPC ........... A01J 5/0175; A01J 3/00; A01J 5/017; G01S 7/4817; G01S 17/42; G01S 17/88; G01S 17/06; G01S 13/06
USPC ................. 119/14.02, 14.08, 14.18; 250/221; 356/51
See application file for complete search history.

(56) References Cited

U.S. PATENT DOCUMENTS

| | | | | |
|---|---|---|---|---|
| 4,590,410 | A | * | 5/1986 | Jonsson ........................ 318/480 |
| 4,726,322 | A | | 2/1988 | Torsius |
| 4,872,147 | A | * | 10/1989 | Hilhorst ......................... 367/96 |
| 5,020,477 | A | | 6/1991 | Dessing et al. |
| 5,042,428 | A | * | 8/1991 | Van der Lely et al. ..... 119/14.08 |
| 5,791,284 | A | * | 8/1998 | van der Lely .............. 119/14.08 |

(Continued)

OTHER PUBLICATIONS

International Search Report (ISA/US) for International Application No. PCT/US2011/036524, mailed Aug. 24, 2011, 1 page.

*Primary Examiner* — Yvonne Abbott-Lewis
(74) *Attorney, Agent, or Firm* — Foley & Lardner LLP; Antoinette F. Konski (57) ABSTRACT

The present invention is a detection device, system and/or method for locating the position of at least an object present in space, such as the position of a teat of an animal. The device may include an array of sensors. Each sensor in the array may incorporate a transmitter-receiver pair. The transmitter and receiver within each pair may be disposed at an angle, to detect an object in space, through the use of signals. Embodiments of the present invention may include one or more detection devices and may be utilized to detect one or more objects present invention space. The device of the present invention may be used in a system for milking dairy animals.

25 Claims, 4 Drawing Sheets

(56) References Cited

U.S. PATENT DOCUMENTS

| | | | |
|---|---|---|---|
| 5,934,220 A * | 8/1999 | Hall et al. | 119/14.08 |
| 6,118,118 A * | 9/2000 | van der Lely et al. | 250/221 |
| 6,213,051 B1 * | 4/2001 | Fransen | 119/14.08 |
| 6,647,919 B2 * | 11/2003 | Vijverberg | 119/14.08 |
| 7,202,467 B2 * | 4/2007 | Koehler et al. | 250/221 |
| 7,952,511 B1 * | 5/2011 | Geer | 342/13 |
| 2003/0090408 A1 | 5/2003 | Matsuura | |
| 2013/0112145 A1 * | 5/2013 | Carroll et al. | 119/14.08 |

* cited by examiner

SENSOR ARRAY FOR LOCATING AN OBJECT IN SPACE

CROSS-REFERENCE TO RELATED APPLICATIONS

This application is a national stage entry under 35 U.S.C. §371 of International Application No. PCT/US2011/036524, filed May 13, 2011, which in turn claims the benefit under 35 U.S.C. §119(e) of U.S. Provisional Application Ser. No. 61/345,011, filed May 14, 2010, and U.S. Provisional Application Ser. No. 61/351,687, filed Jun. 4, 2010, the content of each of which is hereby incorporated by reference into the present disclosure.

FIELD OF THE INVENTION

The present invention relates to devices, systems and methods for locating the position of an object present in space, and more particularly, the present invention relates to devices, systems and methods for detecting the tri-dimensional position of a teat of an animal.

BACKGROUND OF THE INVENTION

Automatic or semi-automatic systems for milking animals, such as a cow, are known in the art. An important aspect of these systems is to locate the teats of the animal.

In some teat location systems of the prior art, dual ultrasound sensors are used to measure distances to the teat. Complex computer algorithms are then necessary to interpret the ultrasound signals.

Similarly, systems with multiple laser sensors are used to send out signals and measure the distance to the teat. Once again computer algorithms are necessary to interpret the signals and calculate the teat location. For example U.S. Pat. No. 6,647,919 discloses a device for determining the spatial position of an animal's teat having transmitter elements for emitting rays or beam of rays, and receiver elements for receiving reflection of the rays or beam of rays. In this invention the location of the teat in general and its disposition at the different levels are determined by triangulation.

Other systems for determining special position of an animal's teat are too complex and not robust enough for the dairy industry. For example, the sensor apparatus disclosed in U.S. Pat. No. 6,118,118 includes moving parts, such as a reflector driven in rotation via a belt and motor, complex optics, and video processing.

Generally, in the prior art, distance measurements and/or complex signal interpretation are used to determine the teat location.

SUMMARY OF THE INVENTION

In one embodiment, the present disclosure relates to a device for locating an object in space, characterized in that the device comprises an array of sensors, each sensor in the array includes a transmitter means capable of substantially transmitting a transmission beam to space, and a receiver means capable of establishing a field of detection in space, said transmitter means and said receiver means being arranged within the array such that a detection zone in space is generated at the intersection between the transmission beam and the field of detection, said receiver means being capable of receiving a reflected beam from said object from said transmission beam and reflected by the object within the detection zone and said receiver means being capable of generating an output signal in response to the reflected beam from the object within the detection zone, wherein the object is located in space when all or substantially all of the receivers in the array generate an output signal substantially simultaneously in response to the object within their respective detection zones.

In another embodiment, the present disclosure relates to a method of locating an object in space characterized in that said method comprises the following steps: (a) moving a device of the present invention for locating an object in space to a start position substantially near to the object in space; (b) transmitting the transmission beams to the object; and (c) moving the device from the start position in a search pattern until the object is within the detection zones of all or substantially all of the sensors in the array thereby generating signals in response to the object within said detection zones, wherein said signals are used to locate the object in space.

In another embodiment, the present disclosure relates to a method of locating an object in space characterized in that said method comprises (a) transmitting a number of transmission beams to space, (b) establishing a number of fields of detection in space, each field of detection being paired to one transmission beam, wherein each field of detection intersects with its paired transmission beam at a detection zone thereby establishing a number of detection zones, (c) generating signals in response to the object within one or more of the number of paired detection zones, and (d) using a controller means for determining the location of the object in space based on the generated signals.

In another embodiment, the present invention relates to a method of milking a dairy animal, said method comprising: (a) moving a device of the present invention for locating an object in space to a start position substantially near to a teat of the animal; (b) transmitting the transmission beams to the teat; (c) moving the device from the start position in a search pattern until teat is within the detection zones of all or substantially all of the sensors of the number of devices thereby generating signals in response to the teat within said detection zones; (d) using the signals to obtain a location for the teat; (e) moving milking means towards the location; and (f) engaging the teat with the milking means thereby milking the animal.

In another embodiment, the present disclosure relates to a system for milking animals characterized in that said system comprises: (a) a milking apparatus for automatically or semi-automatically connecting milking means to teats of an animal to be milked; and (b) one or more devices for locating the position of said teats relative to said milking means, wherein each of said one or more devices comprises an array of sensors, each sensor in the array including a transmitter means capable of transmitting a transmission beam, and a receiver means capable of establishing a field of detection in space, said transmitter means and said receiver means being arranged such that a detection zone in space is generated at the intersection between the transmission beam and the field of detection, and said receiver means is capable of generating a signal in response to a teat within the detection zone in space, wherein the teat is located when all or substantially all of the receivers in the array generate a signal substantially simultaneously in response to the teat within their respective detection zones.

BRIEF DESCRIPTION OF THE DRAWINGS

The invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention is a detection device, system and/or method for locating the position of at least an object present in space, such as the position of a teat of an animal. Embodiments of the present invention may include one or more detection devices and may be utilized to detect one or more objects in space. A sensor device, which may include one or more sensors, may be utilized to determine the position of a teat. Each sensor may incorporate a transmitter-receiver pair. The transmitter and receiver within each pair may be disposed at an angle, to detect an object in space through the use of signals, which may include on and off signals.

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise.

In one embodiment, the present invention provides for a device for locating an object in space. The device may comprise an array of sensors, each sensor in the array may include a transmitter means which may be capable of transmitting a transmission beam, and a receiver means which may be capable of establishing a field of detection or detection field in space. The transmitter means and the receiver means may be aligned or arranged such as establishing a detection zone or sensing volume in space. The transmitter means and the receiver means may be disposed such that the substantially transmitted beam and the field of detection may establish a detection zone or sensing volume in space, which may be located at the intersection between the transmission beam and the field of detection. When substantially emitted, the transmission beam may hit or strike an object in space. If the object is within the detection zone, then the receiver means may be capable of receiving a reflection beam from the object within the detection zone and thereby generating a signal in response to the object within the detection zone in space. In one embodiment of the invention the array of sensors in the device may be configured to establish a number of detection zones in space. The object may be located in space when all or substantially all of the receivers in the array generate a signal substantially simultaneously in response to the reflection from the object within their respective detection zones.

The sensor device of the present invention may allow for minimal computation to process the sensor signals. The sensor device may be operable to determine the location or position of a teat. The present invention may be sufficiently robust to be used in the dairy industry, or other industries.

As such, in one embodiment the present invention discloses a device for locating an object in space, characterized in that said device comprises an array of two or more transmitter-receiver pairs, the transmitter and receiver within each pair being arranged to establish a detection zone in space, and said receiver being capable of generating a signal in response to the object within the detection zone, wherein the object is located in space when all or substantially all of the receivers in the array generate a signal simultaneously in response to the object within their respective detection zones.

The receiver means may only generate a signal in response to an object within the detection zone in space. The detection zone may be defined as the place or zone where the receiver means may be able to receive and detect a reflection of the transmission beam from an object. The substantially emitted beam, such as light, from the transmitter means may hit or strike an object to be detected in a diffuse way and generate a reflective beam. If the object is within the detection zone, then part of the reflected beam from the object may be detected by the receiver means thereby starting the switching signal operation. If the object is not within the detection zone, then the reflection beam may not be detected by the receiver means. The two states—i.e. reflection received or no reflection—may be used to determine the presence or absence of an object in the sensing range. This system may detect objects that have sufficient reflection, such as the teats of an animal. For objects with poor reflection (i.e. matt black rough surfaces) the use of diffuse reflection sensors for short ranges or with background suppression may be recommended. The receiver means may then output a discrete on/off signal to indicate presence or absence of the received reflection beam. In one embodiment of the present invention the signal may typically be an about 0 volt ("off") or an about 5 volt ("on") digital signal. A skilled reader would understand that the exact nature of this signal is not significant to the invention, as it simply represents a communication signal for logical decision making. The object may be identified as having a particular location in space when all, or substantially all, of the receiver means in the array generate a signal simultaneously in response to the object within their respective detection zones.

The present invention may include an embodiment that involves a method of locating an object in space. The method may include at least the following steps: (a) moving a device for locating an object in space of the present invention to a start position that is substantially near to the object in space; (b) transmitting the transmission beams to the object; and (c) moving the device from the start position in a search pattern until all or substantially all the receivers generate a signal in response to the object within their respective detection zones in space, thereby locating the object in space.

Another embodiment of the present invention may include the following additional steps in a method of locating an object in space: (a) transmitting a number of transmission beams to space; (b) establishing a number of fields of detection in space, each field of detection being paired to one transmission beam, wherein each field of detection intersects with its paired transmission beam at a detection zone thereby establishing a number of detection zones; (c) generating signals in response to the object within one or more of the number of paired detection zones; and (d) using a controller means for determining the location of the object in space based on the generated signals.

One embodiment of the present invention may be a system for milking animals that incorporates: (a) a milking apparatus for automatically or semi-automatically connecting milking means, such as teat cups, to a teat or teats of an animal to be milked; and (b) one or more detection devices for locating the position of said teat or teats relative to said milking means. Each detection device may include an array of sensors. Each sensor in the array may include a transmitter means operable to substantially transmit a transmission beam to space. Each sensor may also include a receiver means operable to establish a field of detection in space. The transmitter means and the receiver means may be arranged or positioned so that a detection zone in space is generated at the intersection between the transmission beam and the field of detection. The receiver means may be operable to generate a signal in response to a teat within the detection zone in space. A teat may be identified as being located at a particular area in space relative to a milking means when all, or substantially all, of the receivers in a detection device generate a signal simultaneously in response to the teat within their respective detection zones.

The present invention may offer particular benefits and advantages over the prior art. The prior art is known to apply complex sensors, processors and/or algorithms in order to detect an object in space. For example, in some prior art examples distance measurements and/or complex signal interpretation are used to determine the teat location. The present invention may provide a benefit over the prior art in that it may not incorporate or require the use of complex sensors, processes or algorithms in order to detect an object in space.

The present invention may further offer a benefit or advantage over the prior art in that the sensor utilized in prior art inventions may require moving parts, such as spinning mirrors, complex optics or video processing. The present invention may incorporate a sensor that is physically robust and is particularly appropriate for the dairy environment. The sensor of the present invention may not include any moving parts, such as spinning mirrors, the sensor may also not include any complex optics, or video processing.

Figure 1:
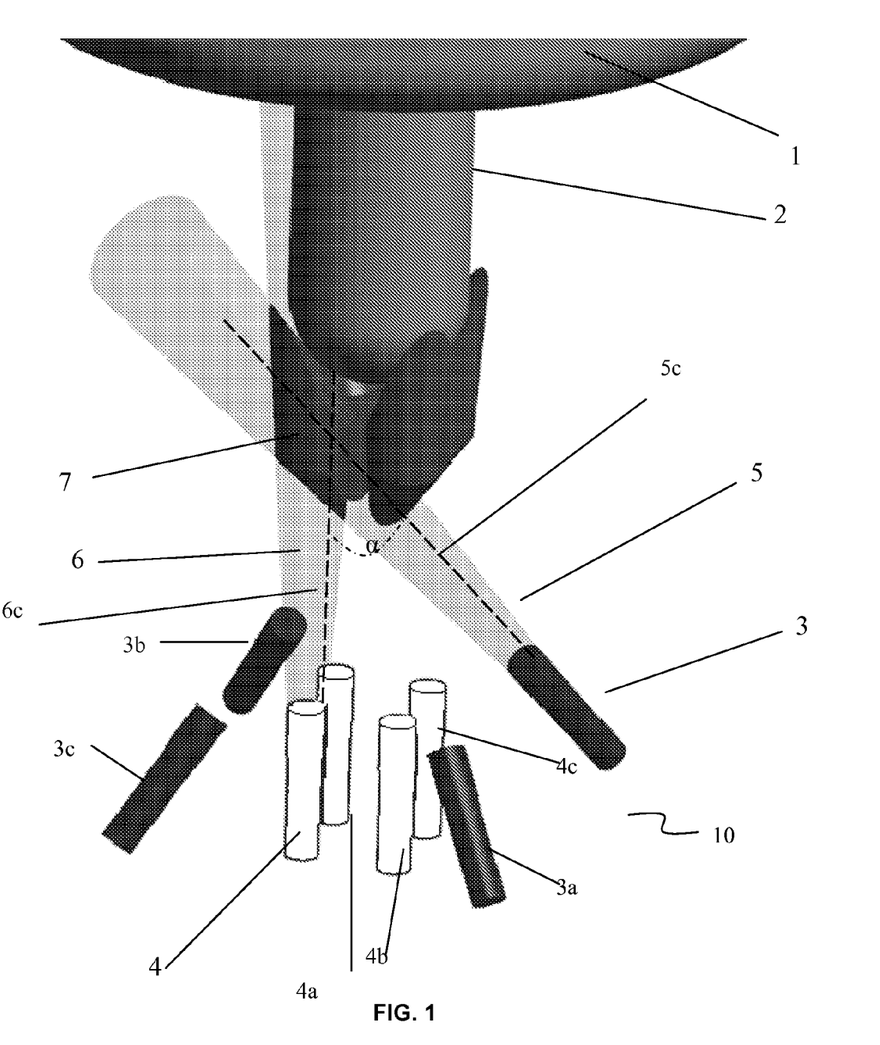
FIG. 1 illustrates a configuration of an array of sensors in accordance to one embodiment of the present invention.

With reference first to FIG. 1, an exemplary embodiment of the present device includes an array 10 of two or more sensors which may be disposed within a housing (not shown). Each sensor in the array 10 may incorporate a receiver means 3 and a transmitter means 4. In the simplified diagram of FIG. 1, just four sensors are shown: 3/4, 3a/4a, 3b/4b and 3c/4c. A skilled reader will recognize that other embodiments of the present invention may include other numbers of sensors, for example, such as arrays of two, three, four or more sensors.

A transmission beam 6 may be substantially emitted from each transmitting means 4, 4a, 4b, 4c in a narrow spread into space. Each receiver means 3, 3a, 3b, 3c in the sensor may be capable of establishing a field of detection 5. The field of detection may correspond to the shape of a light ray bundle which would be emerging from a receiving means if the receiver means is assumed to project light rays. The beam 6 and field of detection 5 may travel along axes 6c and 5c, respectively. The beam 6 and field of detection 5, respectively, may have a small sectional area, and may be adapted to cross each other in a predetermined small field which may be a detection zone 7 of this device 10. The field of detection 5 may be disposed relative to the transmission beam 6 such as establishing an angle α between axes 6c and 5c, thereby creating detection zones or fields 7 in space. That is, a detection zone 7 may be established at the intersection between the transmission beam 6 substantially transmitted by a transmitter means 4 and the field of detection 5 of a receiver 3. This arrangement between transmitter means and receiver means may be known in the art as "definite reflective", meaning the emitter and receiver beam paths intersect at a "definite" location in space. This intersection defines the detection zone or sensing volume.

A portion of the beam emitted from the transmission means 4 may travel along axis 6c and may strike object 5 in space. If the object 5 is within the detection field 7, then some of this beam may be reflected or scattered from object 2 back to strike the receiver means 3.

Each sensor may be mounted and arranged in an array such that an "n" number of detection zones may be established in space. In such an embodiment of the present invention, "n" may be equal to the number of sensors in the array. For example, in one embodiment of the present invention "n" may be two, three or more sensors. Two sensors may be sufficient to determine the position of an object in two dimensions. The principle may be extended to three dimensions through use of one or more additional receiving elements. FIG. 1 shows one possible arrangement of a transmitter means and receiving means, as is used in the embodiment described.

With reference to FIG. 1, the receiver means 3 may be capable of outputting or generating an "on" signal or an "off" signal in response to the object 2 within the detection zone 7 of said receiver means 3. When the object 2, such as the teat of an animal (which may be located in the udder 1 of the animal), crosses into a detection zone 7, a reflection signal of said transmission beam 6 on said object 2 may be received by the receiver 3; that is, the output of the receiver 3 may change from low to high, or vice versa. The object 2 may be detected in space when all, or substantially all, receiver means in the device receive reflection signals.

Each sensor (i.e. transmitter/receiver pair) may be further defined to comprise a lens assembly, which may function to focus the emitter or receiver beam, and an amplifier, which may include the light source and decision-making functions of the sensor.

The transmitter means may be a fibre optic transmitter, whereby the actual transmission of the beam may be from a remote location, where the light source for the beam may be located. The receiver means may also be a fibre optic receiver means that may send the reflection signal across fibre optics to a receiver in a remote location. Accordingly, it should be understood that in the embodiment of the present invention shown in FIG. 1, the components labelled as transmitter means 4 and receiver means 3 may represent the point where the beam emerges from the transmitter and the point where the reflected beam is received by the receiver, but may not represent the actual receiver means and/or transmitter means. In such an embodiment of the present invention, the transmitter means and receiver means may be located at a distance away from the array 10 of sensors.

The angles α between the transmission beams and the fields of detection in a sensor may be adjusted to provide varying zones of detection. To assist with this operability of the present invention, the configuration and location of a transmitter means and a receiver means in a sensor may be alterable in the array. An array may include a periphery portion and a central portion. FIG. 1 illustrates one possible configuration of sensors within array 10, in which the transmitter means 4, 4a, 4b, and 4c may be positioned substantially in the central portion of the array 10, and receiver means 3, 3a, 3b, and 3c may be positioned in the periphery portion of the array 10 as shown in FIG. 1, or the transmitter means may be located at the periphery portion of the array and thereby take-up the prior positions of the receiver means. In this manner the transmitter means may exchange, or swap, positions with the receiver means.

In one embodiment of the present invention, the transmitter-receiver pairs may cross over the path of each other. In another embodiment of the present invention, the transmitter-receiver pairs may be located at each corner of the array separately. A skilled reader will recognize that as long as the transmitter-receiver pairs create zones or volumes of detection which may detect the object of interest, then the configuration or arrangements of the transmitters and receivers within the array may be of various forms.

Figure 2A:
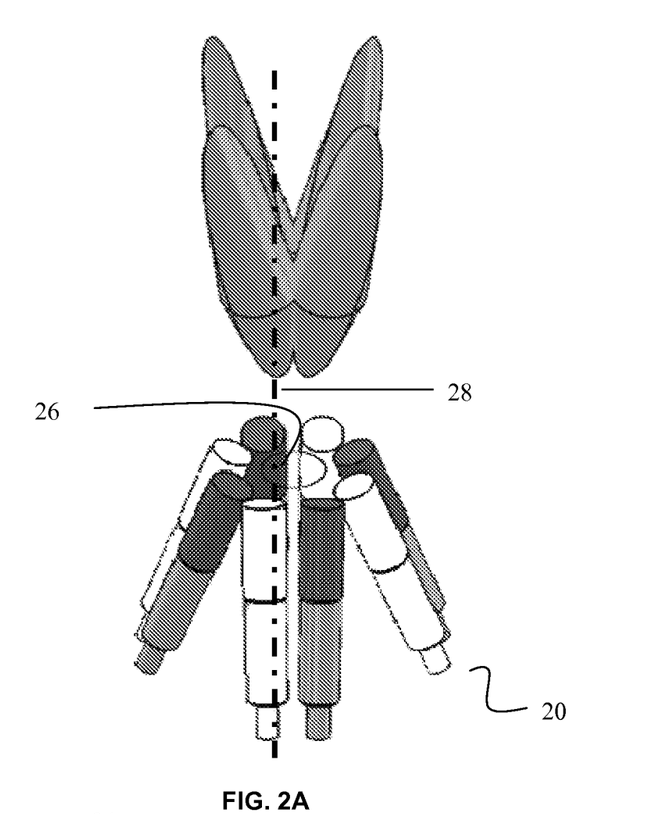
FIG. 2A illustrates a side view of a configuration of an array of sensors in accordance with one embodiment of the present invention.
Figure 2B:
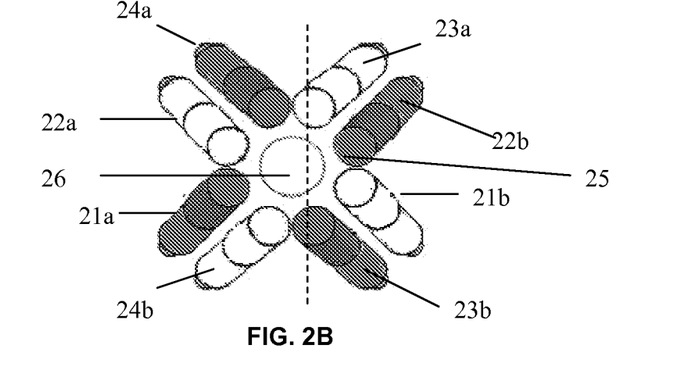
FIG. 2B illustrates a top view of the configuration illustrated in FIG. 2A.
Figure 2C:
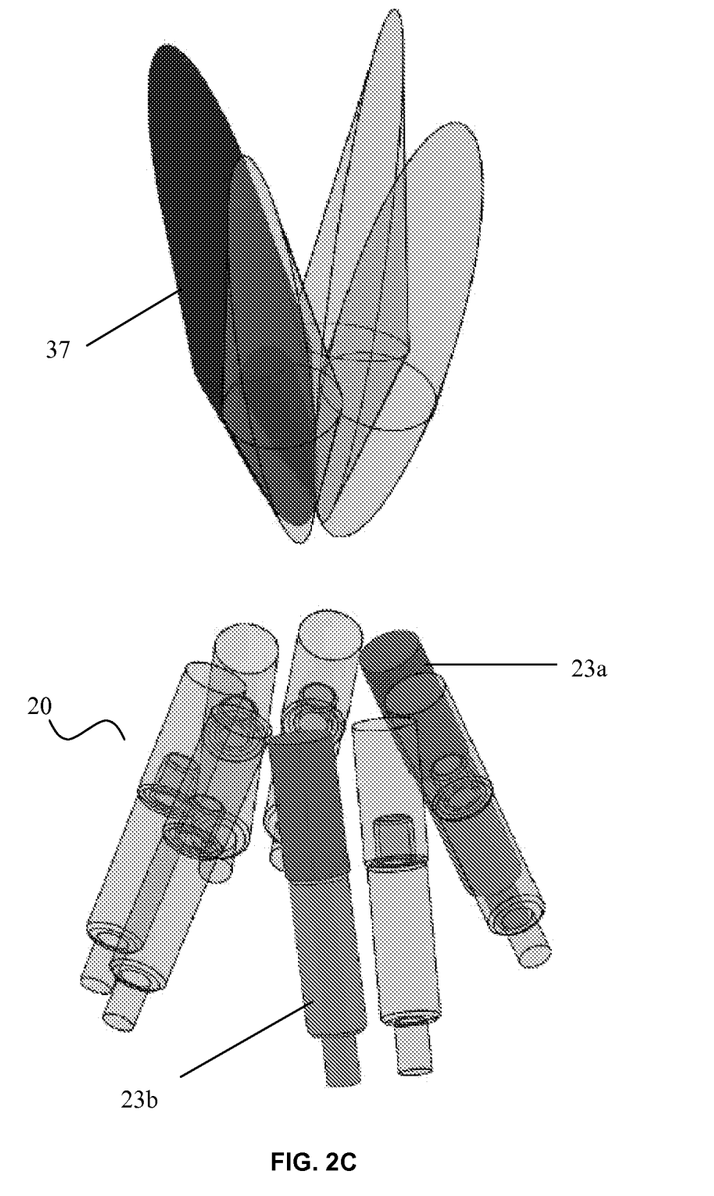
FIG. 2C illustrates a side view of the configuration illustrated in FIG. 2A, depicting a sensor and the detection zone formed by the depicted sensor.

FIGS. 2A, 2B and 2C illustrate yet another manner in which the sensors may be configured in array 20, in which the transmitter/receiver pair may be positioned around a pattern centre line 25. FIGS. 2A and 2C illustrate a lateral view of an array of sensors disposed around a central axis 28. FIG. 2B is a top view of the array 20 of FIGS. 2A and 2C. The array of sensors may be disposed on a base plane. Central axis 28 may be positioned in the center of array 20 and may run perpendicular to the base plane. Transmitter/receiver pairs 21a/21b, 22a/22b, 23a/23b and 24a/24b of array 20 may "lean" substantially towards the center of the array 20, with their transmission and fields of detection crossing a central plane disposed on the center-axis 28 of array 20 such that their corresponding detection volume may be disposed on the other side of the central plane from the corresponding sensor pairs. With reference to FIG. 2C, transmitter/receiver pair 23a/23b are shown to have their transmission and fields of detection crossing the central plane and forming detection volume 37 located on the other side of the central plane. The sensors in array 20 may be disposed such as to substantially form a circle 25 which may reduce the total diameter of the array as compared to the array of the embodiment of the present invention shown in FIG. 1.

The configuration of the array shown in FIGS. 2A, 2B and 2C may offer particular advantages. For example, the array shown in FIGS. 2A, 2B and 2C may result in overall space savings which may be useful for reducing cup-to-cup interference. Additionally, the substantially circular pattern thereby created by the sensors may leave an open location 26 in the center which may be used for accommodating an additional sensor, post-dip spray nozzle, or lens mount hole.

FIG. 2C shows an array 20 having a sensor including a transmission means 23a, receiver means 23b, and detection volume 37. The detection volume 37 may be disposed on the opposite side of the sensor formed by transmission means 23a and receiver means 23b.

In one embodiment of the present invention, angle α formed between the axis of the transmission beam and the axis of the field of detection may be between about 10 degrees and about 80 degrees. In other embodiments of the present invention an angle of less than 10 degrees and more than 80 degrees angles may be used.

The lower angles α may provide less distance resolution relative to the main axis of the transmitter. The higher angles α may require the transmitter and receiver in the sensor to be located farther apart.

In an embodiment of the present invention, α angle may be between about 30 degrees and about 40 degrees. This range may create an acceptable range for distance resolution without creating an overly large sensor block by spreading the transmitter and receiver too far apart. In another embodiment of the present invention the angle α may be about 33.5 degrees.

One piece sensors may be available in the market with both the transmitter and the receiver mounted together on a block. These sensors may be available in the range of 5 to 90 degrees. The one piece sensors found in the market generally consist of a small housing and, therefore, may not achieve both the resolution and range which may be required for the present invention. In addition, the sensors available in the market do not combine multiple transmitter/receiver pairs oriented to provide directional information. A skilled reader will recognize that the sensors of the present invention offer a benefit over prior art sensor for the purpose of detecting an object in space. The devise of the present invention provides for a special arrangement by assembling two separate lenses to function as an emitter/receiver pair (i.e. sensor) which may provide with the correct geometry to obtain directional information. The system of the present invention may use more than one of such pairs, for example four transmitter/receiver pairs, which may be assembled within a housing.

A variety of beam sources may be utilized in the present invention, for example, such as visible light, infrared, laser, or ultrasound. In one embodiment of the present invention the sensor may utilize visible red light. For example, a sensor utilized in the present invention may be a Keyence™ brand sensor. This sensor may utilize visible red light transmitted over fibre optics lines to the lens, which then focuses the transmission beam spread to approximately between 2 and 4 degrees.

To avoid or minimize interference along and among the paths of beams emanating from the transmitters, a number of non-mutually exclusive measures may be used in the present invention. In one embodiment of the present invention, the sensors may be arranged within the sensor array such that the beams avoid disturbing interference. In another embodiment of the present invention, a beam substantially emitted by the transmitters within the sensor array may be modulated so that each receiver in the array may be set to only detect the signal from its corresponding transmitter in the sensor. In another embodiment of the present invention, the transmission frequencies of the transmitters may be mutually differing, and each receiver may be attuned to the frequency of its corresponding transmitter. In yet another embodiment of the present invention, the transmission amplitude of the transmitters may differ as well. A skilled reader will recognize that other embodiments of the present invention are also possible, and that combinations of two or more of the aforementioned measures may also be utilized in embodiments of the present invention.

Regardless of the type(s) of sensor(s) incorporated in the present invention the transmission beam generated by the transmitter may be a narrow beam. For example, the beam emitted by the transmitter may be a beam which is focussed to a narrow range. A narrow beam may enhance the operability of the present invention. In one embodiment of the present invention, the beam spread may be between about zero degrees and 10 degrees. In another embodiment of the present invention, the spread of the narrow beam may range from about zero degrees to about 4 degrees. Ideally the beam spread may be as close to zero as possible, but 2 degrees to 4 degrees may be a preferred workable range for the beam spread. A skilled reader will recognize that the present invention may also be operable when it incorporates a larger beam spread range, for example, a beam spread such as up to 10 degrees or so.

One important application of the device of the present invention may be for the detection of a teat of an animal, for example, such as a teat of a dairy cow. One or more teats of an animal may be detected primarily for the purpose of attaching milking equipment to the animal, for example, such as teat cups. A skilled reader will recognize that the present invention may also be used to detect the teats for washing, pre dipping, post dipping, or other procedures for which the detection of the location of an animal teat is required.

When the present invention is utilized for animals, the present invention may be utilized to detect the teats of dairy cows. A skilled reader will recognize that the sensor of the present invention may be used to detect teats of other animals, for example, such as goats, buffalo or any other milking animals.

Each device of the present invention may be designed to detect one of the animal's teats. As such, an embodiment of the present invention may include two or more of the detection devices described herein in order to detect more than one teat in the animal. Each detection device may include an array of sensors, each sensor may include a transceiver-receiver pair, as described herein. Each detection device may be capable of detecting one of the animal's teats. For example, if such an embodiment of the present invention is applied to an animal having 4 teats, such as a cow, up to four detection devices may be used, each of the up to 4 detection devices to detect one of the four teats. So that, a first detection device of this embodiment of the present invention may be utilized to detect a first teat of the cow, a second detection device of the embodiment of the present invention may be utilized to detect a second teat of the cow, a third detection device of the embodiment of the present invention may be utilized to detect a third teat of the cow, and a fourth detection device of the embodiment of the present invention may be utilized to detect a fourth teat of the cow.

In another embodiment of the present invention, one or more detection devices of the present invention may be incorporated for detecting a number of objects in space relative to the detection devices. The number of detection devices incorporated in a particular embodiment of the present invention may be in accordance with the number of objects to be detected in space. Should one object require detection in space, an embodiment of the present invention including one detection device may be applied. Should more than one object require detection in space, for example, such as two or more teats included in an udder of a cow, or some other set of multiple of objects, an embodiment of the present invention including two or more detection devices may be applied. Therefore, embodiments of the present invention may incorporate a number of detection devices that is one or more detection devices.

Embodiments of the present invention incorporating one or more detection devices may also be utilized as part of a system for milking of dairy animals. For example, a system for milking animals utilizing an embodiment of the present invention may incorporate: (a) a milking apparatus for automatically or semi-automatically connecting milking means, such as teat cups, to a teat or teats of an animal to be milked; and (b) one or more of the detection devices of the present invention, each operable to locate the position of one teat of the animal to be milked. The detection devices may detect the location of a teat or teats, and the milking apparatus may automatically, or semi-automatically, connect the teat cups to each of the detected teat or teats of the animal. The detection devices therefore may generate and transfer information or other forms of guidance regarding the location of the teat or teats. The transferred information, or other forms of guidance, may be utilized by the milking apparatus to determine the position of the teat or teats where the teat cups should be connected. Once the teat cups are connected to the teats the milking apparatus may function to milk the animal by a known process. In one embodiment, the apparatus for milking of dairy animals may be a modular apparatus, which may include a main support, a number of independent modular arms (for example four modular arms for milking of a cow or two modular arms for milking of a goat) coupled to the main support and end of arm tools ("EOATs") pivotally coupled to each of the modular arms. One such modular milking apparatus is described in priority application U.S. Ser. No. 61/351,687 which is incorporated herein by reference, The detection devices of the present invention may be included in the EOATs. The modular arms may be capable of moving substantially in the Z, Y, and X directions for scanning the animal's teat and for positioning of the EOATs in position under an animal.

In one embodiment of the present invention a digital signal processor within the sensor's amplifier processes the signal from the receiver and responds with a discrete on-off signal output to a decision-making controller. A controller, such as a computer or programmable logic controller (PLC), may receive and utilize one or more outputs from one or more of the receivers in the one or more detection devices including in an embodiment of the present invention. The detection devices may be one device or an array of two or more detection devices. The outputs may be utilized by the controller, computer or PLC, in the course of making or otherwise formulating logic decisions regarding the position where the one or more detection devices should be moved in space in order to detect the one or more objects required to be detected in space. In embodiments of the present invention, the controller, computer or PLC may further determine the angle, or aim of each sensor in each of the one or more detection devices to cause the present invention to effectively, efficiently, and/or quickly detect the one or more objects in space.

The controller may be operable to cause the one or more detection devices to be moved in a manner that will preferably provide a signal from all receivers included in each of the one or more detection devices that will lead to detection of the one or more objects. If none of the receivers have detected a signal, the controller may move the detection device in manner to increase the likelihood of detection, for example, such as a searching pattern. Once one or more of the receivers detect a signal, the controller may move the device based on the inputs from the receivers until, preferably, all receivers acquire a signal. In this document "a signal" means an "on" signal or "off" signal indicating that the object has entered into the detection zone of the sensor.

As another example, in the case of an animal having small or irregular teats, the controller may accept less than all of the sensors acquiring a signal. For small and large teat size differentiations, the controller may move the device in the X-Y direction and use the on/off signals from the teat to substantially determine the size of the teat in the X-Y direction. Determination of teat size in the X-Y direction may require just one pass or may require multiple passes in both the X and Y directions before the controller makes a determination that it has located a small teat as opposed to a false signal such as from an irregularity of the udder. A skilled reader will recognize that a similar process may be utilized for the detection in space of objects other than teats.

A method of locating an object in space that may be applied in one embodiment of the present invention may include the following steps:

(a) moving one or more detection devices of the present invention to a start position. In some embodiments of the present invention the start position of each of the one or more detection devices may be substantially near to the one of the one or more objects in space that the detection device is to detect.
(b) transmitting one or more transmission beams, which may be narrow beams. A detection zone may be created at the intersection between the transmission beam and the field of detection.
(c) generating signals from each of the one or more objects within the detection zones and identifying the position of each detected object based on said signals.

Other steps may be included in the method of the present invention in accordance with the embodiment of the present invention that is utilized. For example the method of utilizing the present invention may also include any of the following steps:

(d) transferring information, data or other guidance forms regarding the position of each detected object to another source, such as a controller, computer, PLC or other apparatus, device or machine, for example, such as a milking apparatus.
(e) utilizing the transferred information to determine the position of an element of an apparatus, device or machine to make contact with the detected object in space, or to otherwise make use of the object in space in its detected position.
(c) should the detection device fail to detect an object in space, moving the device from the start position to another position, for example, such as in a searching pattern, or in an X-Y configuration, until all or substantially all the receivers of the detection device output a signal in response to the object within the detection zone in space, and thereby detect the object in space.

A skilled reader will recognize that other steps may be included in a method of utilizing or otherwise applying the present invention.

Figure 3A:
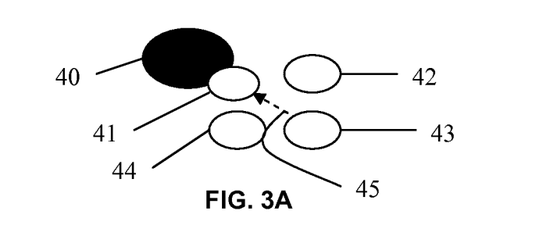
FIG. 3A shows the position of a sensor in relation to an object in space in an embodiment of the present invention.
Figure 3B:
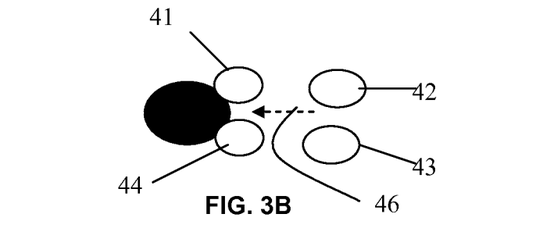
FIG. 3B shows the position of two sensors in relation to an object in space in an embodiment of the present invention.
Figure 3C:
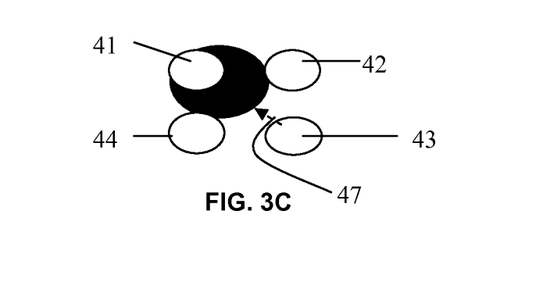
FIG. 3C shows the position of three sensors in relation to an object in space in an embodiment of the present invention.
Figure 3D:
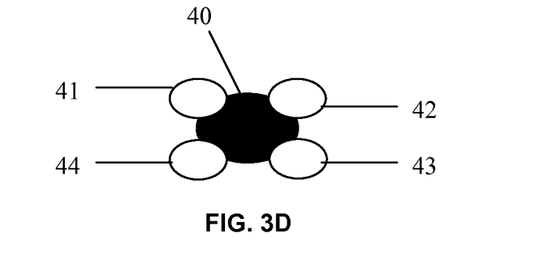
FIG. 3D shows the position of four sensors in relation to an object in space in an embodiment of the present invention.

An example of an embodiment of a method of utilizing the present invention wherein the object in space is the teat of an animal, may be described utilizing the representation of animal teats shown in FIG. 3. In FIG. 3 the teat of an animal 40 (indicated by a black circle) may be detected by one or more sensors having detection zones 41-44 (the detection zones of each sensor indicated by an white oval). A method that is an embodiment of the present invention that may be utilized in relation to the teats of animals, as shown in FIG. 3, the method may include the following steps and these steps may be applied to each of one or more detection devices included in an embodiment of the present invention:

(a) moving a detection device to a start position to detect one of the animal teats. The start position may be a position that is expected to be substantially close or near to where the teat is located.
(b) triggering the sensor if a signal is received in response to a teat within a detection zone, for example, such as a signal being generated in response to the teat within the detection zone;
(d) if the teat is not detected and none of the sensors in the detection device are triggered, the detection device may be moved from the start position to another position. For example, the detection device may be moved in a variety of manners, such as: in a searching pattern; along X and Y coordinates; or in a Z direction. The movement of the detection device may include a combination of manners of movement. This process may be repeated until at least one of the sensors in the array receives a signal.
(e) once at least one sensor in the array is triggered, for example sensor establishing detection zone 41 as shown in FIG. 3A, the detecting device may be moved in a direction that will receive a signal from other sensors if the detecting device includes an array of sensors. For example, if detection zone 41 comes within range of the teat 40 and an output signal is generated, then the device may be moved in substantially a direction whereby other sensors, such as sensors establishing detection zones 42, 43 and/or 44 may also receive output to be triggered. In the configuration shown in FIG. 3A this may involve moving the detection device along the line connecting detection zones 41 and 43 in the direction of broken arrow 45, so that sensor establishing detection zone 44 may be positioned.
(f) once two sensors receive a signal, as may occur in the positioning of the sensors shown in FIG. 3B, wherein sensors establishing detection zones 41 and 44 may receive a signal, the detection device may then be moved in a direction that is, preferably substantially perpendicular to the detection zones of the two triggered sensors, as shown by broken arrow 46 that have provided an output signal to trigger the detection device.
(g) once three sensors receive a signal, as may occur in the positioning of the sensors shown in FIG. 3C, wherein sensors establishing detection zones 41, 42 and 44 may receive a signal, a decision may be made that the location of the teat has been made (for example in the case of an animal having small or irregular teats, a controller may accept less than all sensors acquiring a signal to identify the location of the teat).
(h) alternatively, the device may be moved in a direction to obtain a signal from the fourth sensor in the device. The direction of the movement may possibly be along a line, shown by arrow 47, substantially perpendicular to the two corner detection zones of the sensors that are providing an output. As an example, as shown in FIG. 3C, the two corner detection zones are 42 and 44. FIG. 3D shows a positioning of detection zones 41-44 which may include all of the sensors receiving a signal. Once a signal from all sensors of the detection device has been obtained, then the location of the teat may be identified.
(i) if at any point, any of the sensors lose their signal, for example, such as due to movement of the animal, the controller may attempt to find the teat by taking into account the last sensor that lost its signal, since the teat likely "escaped" in that direction.
(j) alternatively, if at any point any of the sensors lose their signal, for example, such as due to movement of the animal, the controller may repeat the process starting with step (a) and including any subsequent steps in order to regain the location of the teat.

The searching pattern is not limited to the pattern described above and it may involve any suitable form of searching to locate an animal's teat. For example, the searching pattern may take the form of searches outwardly in a spiral pattern from the starting position. The searching pattern may also take the form of a substantially curved (domed, arched) pattern.

Any combination of different search patterns can also be acceptable. A skilled reader will recognize that a variety of searching patterns may be utilized by embodiments of the present invention.

The device of the present invention may be moved by any suitable apparatus. For example, the device of the present invention may be incorporated to the EOATs of the modular milking apparatus described above.

Once the location of the animal's teats is identified with the device of the present invention for locating an object in space, then milking equipment, such as teat cups, may be (i) moved in a direction towards the located teats, (ii) attached to the animal's teats and (iii) substantially engage in milking the animal. For example, in the case of the modular milking apparatus described above, a method of milking a dairy animal may include:

1. In the start position, sensor arrays of the device of the present invention included in the EOATs of the milking apparatus may be moved by rotating the modular arm and EOATs to scan for the teat position.
2. Once the sensor array of an arm locates a teat, the arm of the milking apparatus may move the teat cup to engage the located teat for milking the animal.

The teat cups may be connected to a milk line, which may include a vacuum. The vacuum milk line receives milk discharged from a relevant teat cup for further processing.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto.

We claim:

1. A device for locating an object in space, characterized in that the device comprises an array of sensors, each sensor in the array including a transmitter means capable of substantially transmitting a transmission beam having a spread greater than zero degrees and up to 10 degrees to space, and a receiver means capable of establishing a field of detection in space, said transmitter means and said receiver means of each sensor being arranged within the array such that a detection zone in space is generated at the intersection between the transmission beam and the field of detection, the detection zone of each sensor being generated at a place in space where a reflection of the transmission beam on the object strikes directly said receiver means, and said receiver means being capable of generating an output signal in response to the reflected beam from the object within the detection zone, wherein the object is located in space when all or substantially all of the receivers in the array generate an output signal substantially simultaneously in response to the object within their respective detection zones.

2. The device of claim 1 wherein the output signal is a discrete digital signal to indicate a presence of the object within the detection zone.

3. The device of claim 2 wherein said transmission beam is an ultrasound beam and said receiving means is an ultrasound receiving device.

4. The device of claim 1 wherein the transmission beam has a spread between about 2 degrees and about 4 degrees.

5. The device of claim 4 wherein said transmission beam is a visible light, infrared or laser beam.

6. The device of claim 5 wherein the receiving means is a light receiving photoelectric device.

7. The device of claim 5 wherein the transmission beam travels along a first axis and the field of detection is established along a second axis, and wherein an angle formed between said first and second axes is between about 10 degrees and about 80 degrees.

8. The device of claim 1 wherein said array includes 4 sensors, and wherein said transmitter means in the four sensors are arranged to form a first ring in a center portion of the array and said receiver means are arranged to form a second ring in a periphery portion of the array and around said first ring of transmitter means.

9. The device of claim 1 wherein said array includes 4 sensors, and wherein said receiver means in the four sensors are arranged to form a first ring in a center portion of the array and said transmitter means are arranged to form a second ring in a periphery portion of the array and around said receiver means.

10. The device of claim 1 wherein said array includes 4 sensors, and wherein the transmitter means and said receiver means are arranged to form a ring on a same base plane of the array around a central axis which runs perpendicular to the base plane.

11. The device of claim 10 wherein the transmitter means and the receiver means of each sensor are located on a same side of the ring, and wherein the transmitter means and receiver means are positioned to substantially lean towards the central axis such that the first and second axes of the transmitter and receiver means generate the detection zone on the other side of the ring.

12. The device of claim 1 wherein said device further comprises a computing means operative in response to output signals from said receiver means.

13. The device of claim 1 wherein said device further comprises a housing for enclosing said array of sensors.

14. The device of claim 1 wherein said object is a teat of a dairy animal.

15. The device of claim 14 wherein said device includes a number of arrays of sensors, wherein said number corresponds to the number of teats of the dairy animal.

16. The device of claim 14 wherein said dairy animal is a cow and said device includes four arrays of sensors.

17. A method of locating an object in space characterized in that said method comprises the following steps: (a) moving the device of claim 1 to a start position substantially near to the object in space; (b) transmitting the transmission beams having the spread greater than zero degrees and up to 10 degrees; and (c) moving the device from the start position in a search pattern until the object is within the detection zones of all or substantially all of the sensors in the array thereby generating signals in response to the object within said detection zones, wherein said signals are used to locate the object in space.

18. The method of claim 17 wherein said method further includes transferring said signals to a computer means.

19. The method of claim 18 wherein said computing means is capable of controlling the movement of the device based on the signals.

20. The method of claim 18 wherein said computing means is capable of controlling the output of an apparatus based on the signals.

21. The method of claim 20 wherein said apparatus is a milking apparatus.

22. The method of claim 17 wherein said method further includes using the signals to substantially determine a size of the object.

23. The method of claim 17 wherein said search pattern includes (a) moving the device until at least one sensor generates a signal, and (b) moving the device in a direction whereby the other sensors in the array receive a signal.

24. A method of milking a dairy animal, said method comprising:
   (a) moving a device according to claim 1 to a start position substantially near to a teat of the animal;
   (b) transmitting the transmission beams to space;

(c) moving the device from the start position in a search pattern until the teat is within the detection zones of all or substantially all of the sensors of the number of devices thereby generating signals in response to the number of teats within said detection zones, said search pattern including (a) moving the device until at least one sensor generates a signal, and (b) moving the device in a direction whereby the other sensors in the array receive a signal;

(d) using the signals to obtain a location of the teat;

(e) moving milking means towards the location; and (f) engaging the teat with the milking means thereby milking the animal.

25. A system for milking animals characterized in that said system comprises: (a) a milking apparatus for automatically or semi-automatically connecting milking means to teats of an animal to be milked; and (b) one or more devices for locating the position of said teats relative to said milking means, wherein each of said one or more devices comprises an array of sensors, each sensor in the array including a transmitter means capable of transmitting a transmission beam having a spread greater than zero degrees and up to 10 degrees, and a receiver means capable of establishing a field of detection in space, said transmitter means and said receiver means of each sensor being arranged such that a detection zone in space is generated at the intersection between the transmission beam and the field of detection, the detection zone of each sensor being generated at a place in space where a reflection of the transmission beam on the object strikes directly said receiver means and said receiver means is capable of generating a signal in response to the reflection beam from a teat within the detection zone in space, wherein the teat is located when all or substantially all of the receivers in the array generate a signal substantially simultaneously in response to the teat within their respective detection zones.

* * * * *